(12) United States Patent  
Lee (10) Patent No.: US 11,975,776 B2  
(45) Date of Patent: May 7, 2024

(54) STEERING WHEEL CONTROL APPARATUS AND METHOD OF SBW SYSTEM

(71) Applicant: HYUNDAI MOBIS CO., LTD., Seoul (KR)

(72) Inventor: Tae Hee Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 378 days.

(21) Appl. No.: 17/469,929

(22) Filed: Sep. 9, 2021

(65) Prior Publication Data

US 2023/0012253 A1 Jan. 12, 2023

(30) Foreign Application Priority Data

Jul. 6, 2021 (KR) .................. 10-2021-0088449

(51) Int. Cl.
| | |
|---|---|
| *B62D 15/02* | (2006.01) |
| *B60R 25/0215* | (2013.01) |
| *B60W 30/18* | (2012.01) |
| *B62D 5/00* | (2006.01) |
| *B62D 6/00* | (2006.01) |
| *G05D 1/00* | (2006.01) |
| *G05D 1/02* | (2020.01) |

(52) U.S. Cl.
CPC .......... *B62D 6/008* (2013.01); *B60R 25/0215* (2013.01); *B62D 5/006* (2013.01)

(58) Field of Classification Search
None
See application file for complete search history.

(56) References Cited

U.S. PATENT DOCUMENTS

| 11,597,437 B2 * | 3/2023 | Schäfer ................. B62D 6/008 |
| 2009/0062083 A1 | 3/2009 | Nakanishi |
| 2018/0120841 A1 * | 5/2018 | Endo .................... B60W 10/02 |

FOREIGN PATENT DOCUMENTS

| CN | 100414917 C * | 8/2008 | ............. H04L 12/12 |
| DE | 10 2014 016 017 A1 | 5/2016 | |
| DE | 102019216284 A1 * | 6/2020 | |
| DE | 10 2019 208 201 B3 | 10/2020 | |
| JP | 2008-80968 A | 4/2008 | |
| KR | 10-2009-0023299 A | 3/2009 | |
| KR | 10-2013-0127861 A | 11/2013 | |
| KR | 10-2019-0066995 A | 6/2019 | |

OTHER PUBLICATIONS

Korean Office Action dated Mar. 6, 2023, in counterpart Korean Patent Application No. 10-2021-0088449 (6 pages in Korean).

* cited by examiner

*Primary Examiner* — Jonathan M Dager  
*Assistant Examiner* — Laura E Linhardt  
(74) *Attorney, Agent, or Firm* — NSIP Law (57) ABSTRACT

A steering wheel control apparatus of an SBW (Steer-By-Wire) system may include a dominant controller configured to generate a wake-up signal, in response to an ignition switch of a vehicle being off, a motor driver configured to generate a steering reaction force against a steering wheel through a motor, and a steering wheel controller configured to generate the steering reaction force to interrupt a turn of the steering wheel, by controlling the motor driver according to the wake-up signal.

17 Claims, 6 Drawing Sheets

STEERING WHEEL CONTROL APPARATUS AND METHOD OF SBW SYSTEM

CROSS-REFERENCE TO RELATED APPLICATION

This application the benefit under 35 USC § 119(a) of Korean Patent Application No. 10-2021-0088449, filed on Jul. 6, 2021, in the Korean Intellectual Property Office, the entire disclosure of which is incorporated herein by reference for all purposes.

BACKGROUND

Field

Exemplary embodiments of the present disclosure relate to a steering wheel control apparatus and method of an SBW (Steer-By-Wire) system, and more particularly, to a steering wheel control apparatus and method of an SBW system, which can generate a steering reaction force against a steering wheel while an ignition switch is turned off.

Discussion of Related Art

An SBW system can remove a mechanical connection between a steering wheel and a front wheel of a vehicle, and steer the front wheel according to an electric signal generated through the turn of the steering wheel.

The SBW system has no physical link between an SAF (Steering Force Actuator) and an RWA (Road Wheel Actuator). The SAF is physically connected to the steering wheel which can be manipulated by a driver, and the RWA is physically connected to a tire which is actually steered.

The SBW system may be normally waken up and driven, after a driver starts the vehicle or an ignition key is turned on.

The related art of the present disclosure is disclosed in Korean Patent Application Laid-Open No. 10-2019-0066995 published on Jun. 14, 2019 and entitled "Method for Generating Steering Reaction Force of Steer-By-Wire System".

The conventional SBW system has no mechanical/electrical load on the steering wheel and the column structure of the SFA. Thus, the steering wheel is easily turned even by a small force while the ignition key is turned off. As a result, when a driver gets in or out of the vehicle with his/her hand held on the steering wheel, the steering wheel may be suddenly and momentarily turned. In this case, the driver may be injured or unsatisfied with the quality of the steering wheel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided steering wheel control apparatus of an SBW (Steer-By-Wire) system, including a dominant controller configured to generate a wake-up signal, in response to an ignition switch of a vehicle being off, a motor driver configured to generate a steering reaction force against a steering wheel through a motor, and a steering wheel controller configured to generate the steering reaction force to interrupt a turn of the steering wheel, by controlling the motor driver according to the wake-up signal.

The dominant controller may be configured to generate the wake-up signal, in response to a smart key being manipulated while the ignition switch is turned off.

The dominant controller may be configured to generate the wake-up signal, in response to a door handle of the vehicle being manipulated to open a door while the ignition switch is turned off.

The steering wheel controller may be configured to generate the steering reaction force against the steering wheel for a time period, in response to the wake-up signal being received.

The steering wheel controller may be configured to generate the steering reaction force against the steering wheel until the ignition switch is turned on, in response to the wake-up signal being received.

The steering wheel controller may include a steering wheel control configured to control the motor driver to generate the steering reaction force against the steering wheel, a regulator configured to supply operation power to the steering wheel control, a power switch configured to control power supplied to the regulator from a battery, a switch controller configured to control the power switch to supply power from the battery to the regulator or to block the power, and a CAN (Controller Area Network) transceiver configured to receive the wake-up signal from the dominant controller and to control the switch controller.

The steering wheel controller may be configured to short a phase of the motor through the motor driver to generate a counter electromotive force against the motor when the steering wheel is turned by an external force.

In another general aspect, there is provided steering wheel control method of an SBW (Steer-By-Wire) system, including generating, by a dominant controller, a wake-up signal while an ignition switch of a vehicle is turned off, and generating, by a steering wheel controller, a steering reaction force to interrupt a turn of a steering wheel, by controlling a motor driver according to the wake-up signal.

The generating of the steering reaction force to interrupt the turn of the steering wheel may include shorting, by the steering wheel controller, a phase of a motor through the motor driver to generate a counter electromotive force against the motor when the steering wheel is turned by an external force.

In another general aspect, there is provided steering wheel control apparatus of an SBW system, including a motor driver configured to generate a steering reaction force against a steering wheel through a motor, and a steering wheel controller configured to generate the steering reaction force to interrupt a turn of the steering wheel, by controlling the motor driver, in response to an ignition switch off signal being received.

The steering wheel controller may be configured to generate the steering reaction force against the steering wheel for a time period, in response to the ignition switch off signal being inputted.

The steering wheel controller may be configured to generate the steering reaction force against the steering wheel, until a door handle of a vehicle is manipulated to close a door, in response to the ignition switch off signal being inputted.

The steering wheel controller may be configured to generate the steering reaction force against the steering wheel, until no driver is sensed in the vehicle, in response to the ignition switch off signal being inputted.

The steering wheel controller may include a steering wheel control configured to generate a steering reaction force against the steering wheel by controlling the motor driver, in response to the ignition switch off signal being inputted, a regulator configured to supply operation power to the steering wheel control, a power switch configured to control power supplied to the regulator from a battery, a switch controller configured to control the power switch to supply power from the battery to the regulator or to block the power, and a CAN transceiver configured to receive the ignition switch off signal, and to enter a sleep mode according to a control signal of the steering wheel controller.

The steering wheel controller is further configured to short a phase of the motor through the motor driver to generate a counter electromotive force against the motor when the steering wheel is turned by an external force.

In another general aspect, there is provided steering wheel control method of an SBW (Steer-By-Wire) system, including receiving, by a steering wheel controller, an ignition switch off signal, and generating, by the steering wheel controller, a steering reaction force to interrupt a turn of a steering wheel, by controlling a motor driver.

The generating of the steering reaction force to interrupt the turn of the steering wheel may include shorting, by the steering wheel controller, a phase of a motor through the motor driver to generate a counter electromotive force against the motor when the steering wheel is turned by an external force.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Hereinafter, a steering wheel control apparatus and method of an SBW (Steer-By-Wire) system will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
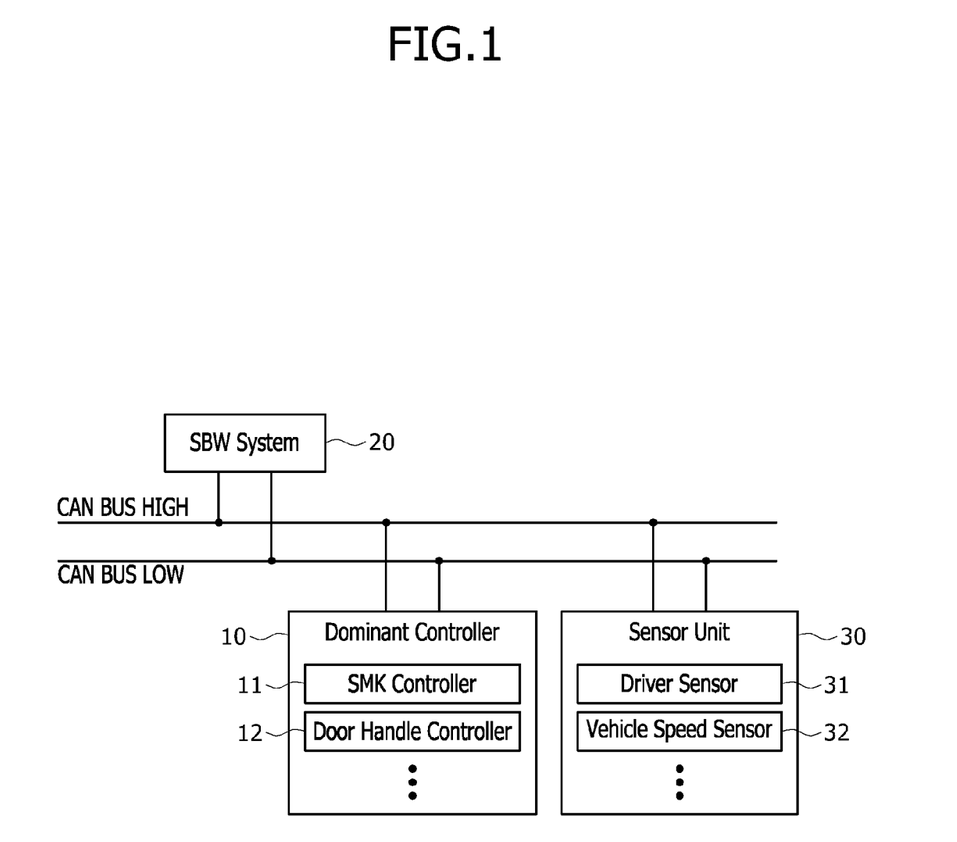
FIG. 1 is a block configuration diagram illustrating a steering wheel control apparatus of an SBW system in accordance with an embodiment of the present disclosure.
Figure 2:
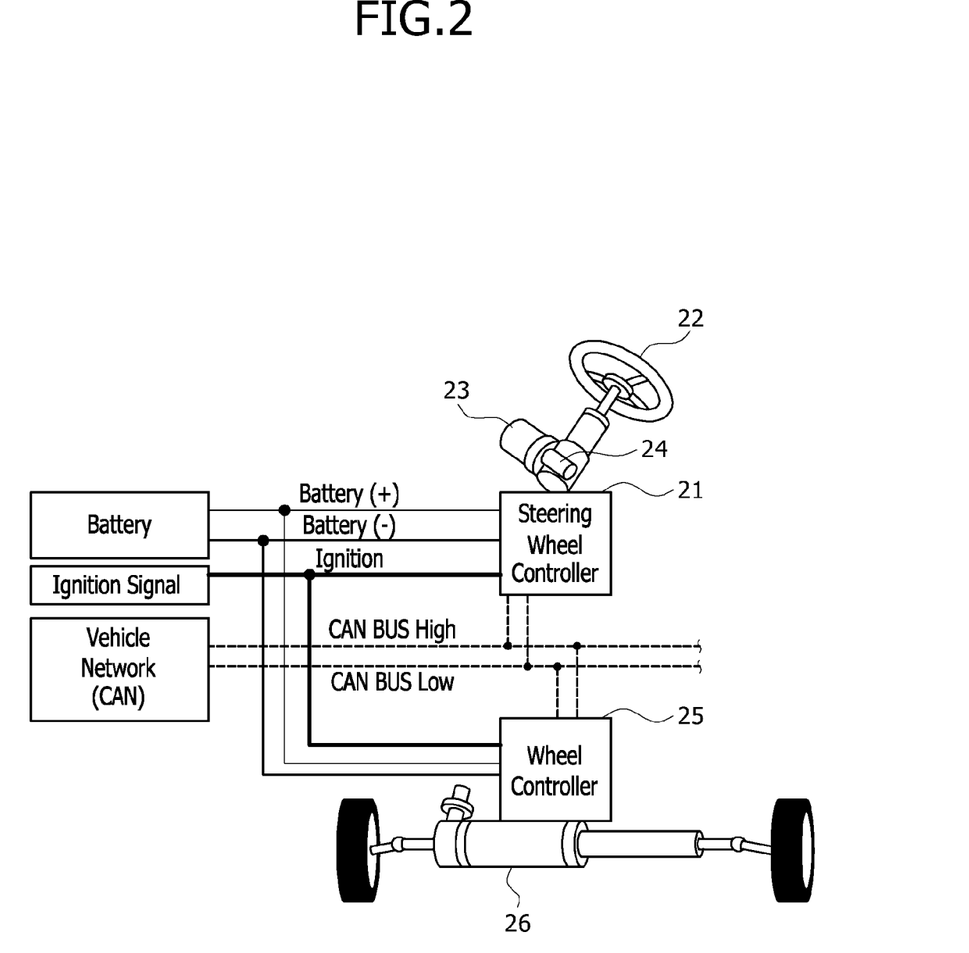
FIG. 2 is a block configuration diagram illustrating the SBW system in accordance with the embodiment of the present disclosure.
Figure 3:
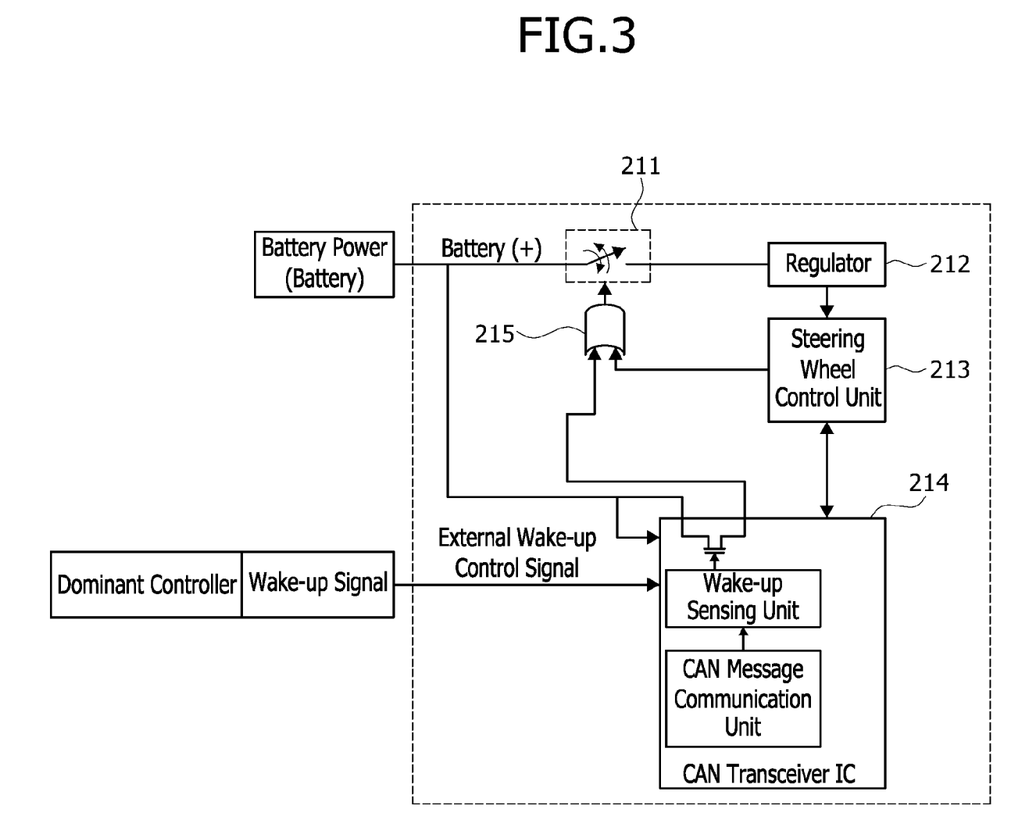
FIG. 3 is a block configuration diagram illustrating a steering wheel controller in accordance with the embodiment of the present disclosure.
Figure 4:
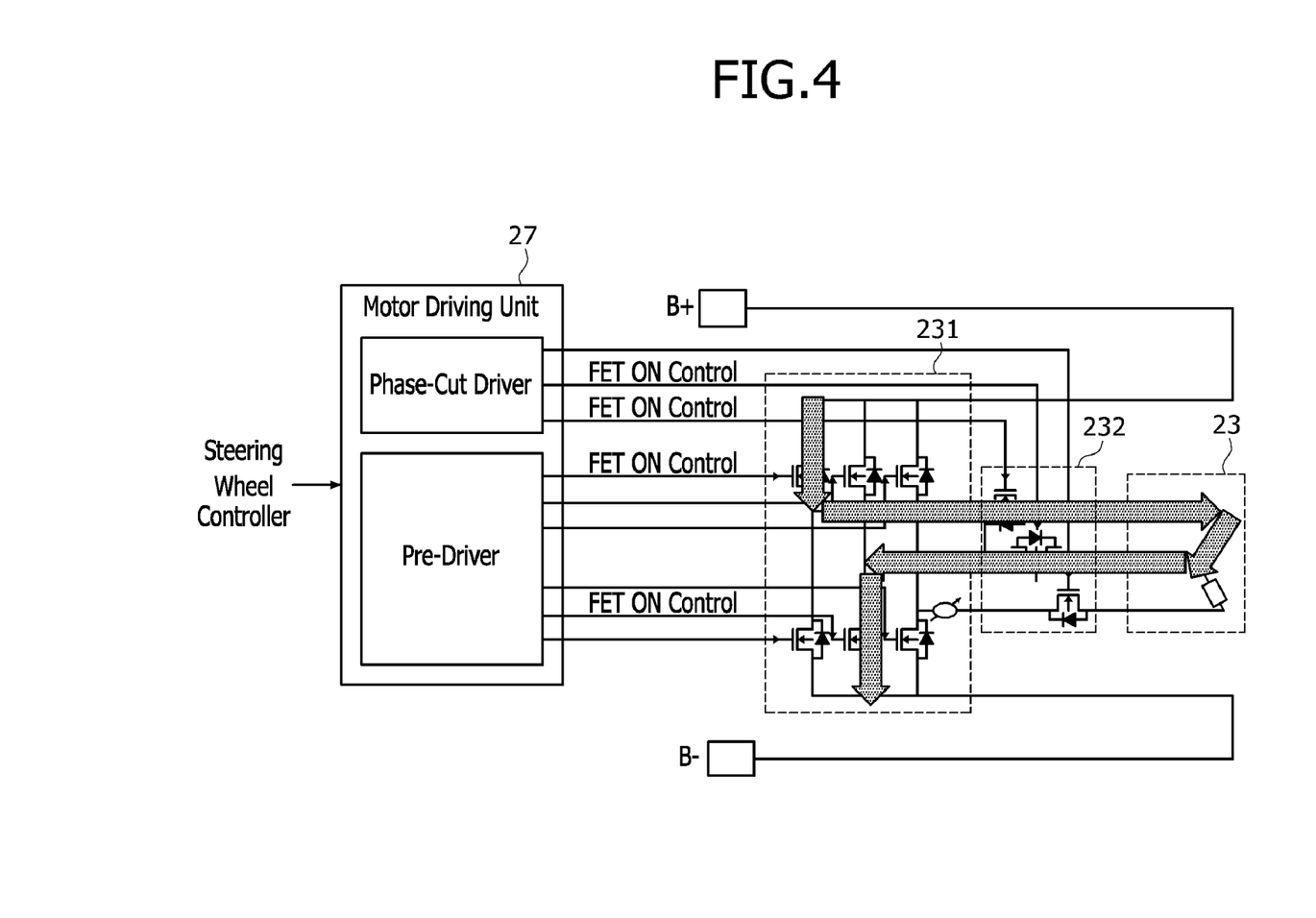
FIG. 4 is a circuit diagram illustrating a motor driving unit or a motor driver in accordance with the embodiment of the present disclosure.

FIG. 1 is a block configuration diagram illustrating a steering wheel control apparatus of an SBW system in accordance with an embodiment of the present disclosure, FIG. 2 is a block configuration diagram illustrating the SBW system in accordance with the embodiment of the present disclosure, FIG. 3 is a block configuration diagram illustrating a steering wheel controller in accordance with the embodiment of the present disclosure, and FIG. 4 is a circuit diagram illustrating a motor driving unit or a motor driver in accordance with the embodiment of the present disclosure.

Referring to FIG. 1, a steering wheel control apparatus of an SBW system in accordance with an embodiment of the present disclosure includes a dominant controller 10, an SBW system 20 and a sensor unit 30.

The dominant controller 10, the SBW system 20 and the sensor unit 30 are connected through a CAN (Controller Area Network) bus.

The dominant controller 10, the SBW system 20 and the sensor unit 30 transmit/receive various pieces of information or signals to/from one another through the CAN bus.

For example, the dominant controller 10 may transfer a wake-up signal to the SBW system 20 through the CAN bus, the wake-up signal being used to activate a steering wheel controller 21 of the SBW system 20. The sensor unit 30 may transfer sensed information to the SBW system 20 through the CAN bus. The information sensed by the sensor unit 30 may include vehicle speed information and driver sensing information, and is not specifically limited thereto.

As described above, the dominant controller 10, the SBW system 20 and the sensor unit 30 may be connected through the CAN bus. However, the present disclosure is not limited thereto, but the dominant controller 10, the SBW system 20 and the sensor unit 30 may be connected through various communication methods or structures.

The dominant controller 10 is a controller serving as a dominant, and always maintains an activated state even when the ignition switch is turned off. In the present embodiment, the SBW system 20 may operate as a non-dominant controller 10.

The dominant controller 10 transfers a wake-up signal to the SBW system 20 of the vehicle, when a driver wants to get in the vehicle, before the vehicle is started, i.e. while the ignition switch is turned off. The SBW system 20 may be activated according to the wake-up signal received from the dominant controller 10.

The dominant controller 10 may include an SMK (Smart Key) controller 11 and a door handle controller 12.

The SMK controller 11 may sense a smart key (not illustrated) around the vehicle. When a door open button (not illustrated) of the smart key is held down, the SMK controller 11 may control the vehicle to open a door (not illustrated) according to the held door open button. The SMK controller 11 may transfer the wake-up signal to the SBW system 20 of the vehicle, when the smart key of the vehicle is sensed, the door open button of the smart key is held down, or a door handle of the vehicle is manipulated.

When the door handle of the vehicle is manipulated, the door handle controller 12 may transfer the wake-up signal to the SBW system 20.

In the present embodiment, the SMK controller 11 and the door handle controller 12 have been exemplified as the dominant controller 10. However, the present disclosure is not limited thereto, and the dominant controller 10 may include any controllers as long as the controllers can check a driver's intention to get in the vehicle.

The sensor unit 30 senses the driver or the speed of the vehicle, and transfer the sensing information to the SBW system 20 through the CAN bus.

The sensor unit 30 may include a driver sensor 31 and a vehicle speed sensor 32.

The driver sensor 31 senses a driver on board the vehicle.

The driver sensor 31 may include an image sensor configured to capture an image of a driver, a biological signal sensor configured to sense a biological signal of the driver, and a weight sensor installed in a driver's seat and configured to sense the weight of the driver. The driver sensor 31 is not limited to the above-described embodiment, but may include any sensors as long as the sensors can sense a driver on board the vehicle.

The vehicle speed sensor 32 senses a vehicle speed. The vehicle speed sensor 32 may be a navigation system or a wheel speed sensor that senses a wheel speed, and the present disclosure is not specifically limited thereto.

The SBW system 20 can remove a mechanical connection between a steering wheel 22 and a front wheel of the vehicle, and steer the front wheel according to an electric signal generated through the turn of the steering wheel 22.

Referring to FIG. 2, the SBW system 20 includes a steering wheel controller 21 and a wheel controller 25.

The steering wheel controller 21 controls the steering wheel 22 based on the turn direction, the angle and the torque of the steering wheel 22, while the vehicle travels.

The steering wheel controller 21 is activated according to a wake-up signal inputted from the dominant controller 10 when the driver gets in the vehicle, and generates a steering reaction force to disturb or interrupt the turn of the steering wheel 22.

Besides, even though an ignition switch off signal is inputted when the driver gets out of the vehicle, the steering wheel controller 21 continuously maintains the activated state, and generates a steering reaction force to disturb or interrupt the turn of the steering wheel 22.

As the steering wheel controller 21, an SFA (Steering Force Actuator) controller may be employed. However, the present disclosure is not limited thereto, but the steering wheel controller 21 may include any controllers as long as the controllers can be installed in the SBW system 20 and control the steering wheel 22.

The wheel controller 25 controls the front wheel under steering control of the steering wheel controller 21.

As the wheel controller 25, an RWA (Road Wheel Actuator) controller may be employed. However, the present disclosure is not limited thereto, but the wheel controller 25 may include any controllers as long as the controllers can be installed in the SBW system 20 and control an operation of a wheel.

The steering wheel controller 21 and the wheel controller 25 may be not only connected to each other through the CAN bus, but also connected to the dominant controller 10 and the sensor unit 30 through the CAN bus, and transmit/receive various signals and various pieces of information as described above.

The steering wheel controller 21 and the wheel controller 25 may be operated by power supplied from a battery (not illustrated).

In FIG. 2, reference numeral 26 represents a front wheel motor for rotating the front wheel.

Referring to FIG. 3, the steering wheel controller 21 includes a steering wheel control unit or a steering wheel control 213, a regulator 212, a power switch 211, a switch control unit or a switch controller 215 and a CAN transceiver 214.

The CAN transceiver 214 receives a wake-up signal from the dominant controller 10. The CAN transceiver 214 inputs a control signal to the switch control unit 215 to turn on the power switch 211, according to the wake-up signal.

The power switch 211 controls power supplied to the regulator 212 from the battery. The power switch 211 is turned on or off according to the control signal inputted from the switch control unit 215.

The regulator 212 converts the power, supplied from the battery through the power switch 211, into operation power required for an operation of the steering wheel control unit 213, for example, 3.3 V or 5.0 V, and supplies the operation power to the steering wheel control unit 213.

The switch control unit 215 controls the power switch 211 to supply the power from the battery to the regulator 212 or to block the power.

In this case, when a control signal is initially inputted from the CAN transceiver 214, the switch control unit 215 turns on the power switch 211. Then, when the control signal is inputted from the steering wheel control unit 213, the switch control unit 215 stores the control signal such that the power switch 211 maintains the turn-on state. That is, the switch control unit 215 may have a latch structure, and turn on the power switch 211 according to the control signal which is initially inputted from the CAN transceiver 214. Then, the switch control unit 215 may perform a latch function according to the control signal inputted from the steering wheel control unit 213, such that the power switch 211 continuously maintains the turn-on state. Thus, the operation power may be stably supplied to the steering wheel control unit 213.

The steering wheel control unit 213 is operated by the operation voltage supplied from the regulator 212.

The steering wheel control unit 213 may perform self-diagnosis. The steering wheel control unit 213 diagnoses faults of various elements in the steering wheel controller 21, for example, the regulator 212, the power switch 211, the switch control unit 215, the CAN transceiver 214 and the like.

The steering wheel control unit 213 may transfer the diagnosis result to a cluster (not illustrated) through the CAN bus. The cluster outputs the diagnosis result of the SBW system 20 with a warning light or sound, such that the driver can recognize a fault of the SBW system 20.

First, when the wake-up signal is inputted from the dominant controller 10 while the ignition switch of the vehicle is turned off, the steering wheel control unit 213 is activated to generate a steering reaction force against the steering wheel 22.

That is, when the wake-up signal is transferred from the dominant controller 10, the CAN transceiver 214 inputs the control signal to the switch control unit 215. At this time, the switch control unit 215 turns on the power switch 211 according to the corresponding control signal.

As the power switch 211 is turned on, the power of the battery is inputted to the regulator 212. The regulator 212 converts the power of the battery into the operation power of the steering wheel control unit 213, and inputs the operation power to the steering wheel control unit 213. Thus, the steering wheel control unit 213 is activated.

As the steering wheel control unit 213 is activated, the steering wheel control unit 213 inputs the control signal to the switch control unit 215. Then, when the control signal is inputted from the steering wheel control unit 213, the switch control unit 215 stores the control signal such that the power switch 211 maintains the turn-on state. Thus, the power switch 211 continuously maintains the turn-on state, and the operation power is stably supplied to the steering wheel control unit 213.

As described above, the steering wheel control unit 213 is activated to receive the vehicle speed from the vehicle speed sensor 32, and determines whether the vehicle is stopped, based on the vehicle speed.

When the vehicle is stopped, the steering wheel control unit 213 determines whether the ignition switch is turned off, based on the ignition switch off signal.

When the ignition switch is turned off, the steering wheel control unit 213 controls a motor driving unit 27 to generate a steering reaction force against the steering wheel 22 in the opposite direction of a turn direction by an external force.

At this time, a torque sensor 24 senses the torque of the steering wheel 22, and inputs the sensed torque to the steering wheel control unit 213. The steering wheel control unit 213 generates the steering reaction force against the steering wheel 22 in the opposite direction of the turn direction by the external force, according to the torque of the steering wheel 22, inputted from the torque sensor 24. The process of generating the steering reaction force against the steering wheel 22 through the motor driving unit 27 will be described below.

In this case, the steering wheel control unit 213 may generate the steering reaction force against the steering wheel 22 during a preset get-on time after the wake-up signal is received from the dominant controller 10.

The get-on time typically indicates the time required until the driver gets on the vehicle, after the smart key is sensed. The get-on time may be set to various values depending on the distance at which the smart key is sensed or the moving speed of a typical driver, and the present disclosure is not limited thereto.

The steering wheel control unit 213 may generate the steering reaction force against the steering wheel 22 until the ignition switch is turned on after the wake-up signal is received from the dominant controller 10. When the ignition switch is turned on, the steering wheel control unit 213 needs to perform a normal steering assist function. Thus, the steering wheel control unit 213 provides the steering reaction force to the steering wheel 22 until the ignition switch is turned on.

Then, when the ignition switch of the vehicle is turned off because the traveling was ended, i.e. when the ignition switch off signal is inputted while the ignition switch is turned on, the steering wheel control unit 213 does not enter a sleep mode, but generates a steering reaction force against the steering wheel 22.

In this case, the steering wheel control unit 213 controls the CAN transceiver 214 not to input the control signal to the switch control unit 215.

Furthermore, the steering wheel control unit 213 continuously inputs the control signal to the switch control unit 215. Thus, as the power switch 211 continuously maintains the turn-on state to stably supply the operation power to the steering wheel control unit 213, the steering wheel control unit 213 maintains an activated state.

Then, the steering wheel control unit 213 controls the motor driving unit 27 to generate the steering reaction force against the steering wheel 22 in the opposite direction of the turn direction by the external force.

At this time, the torque sensor 24 senses the torque of the steering wheel 22, and inputs the sensed torque to the steering wheel control unit 213. The steering wheel control unit 213 generates the steering reaction force against the steering wheel 22 in the opposite direction of the turn direction by the external force according to the torque of the steering wheel 22, inputted from the torque sensor 24.

In this case, the steering wheel control unit 213 may generate the steering reaction force against the steering wheel 22 during a preset get-off time after the ignition switch off signal is inputted.

The get-off time indicates the time required until the driver gets out of the vehicle after the ignition switch is turned off. The get-off time may be set to various values according to a get-off time of a typical driver.

Furthermore, the steering wheel control unit 213 may generate a steering reaction force until the door handle of the vehicle is manipulated to close the door, after the ignition switch off signal is inputted to the steering wheel 22.

Furthermore, the steering wheel control unit 213 may generate a steering reaction force against the steering wheel 22 until no driver is sensed by the driver sensor 31.

The motor driving unit 27 generates the steering reaction force against the steering wheel 22 through a steering wheel motor 23 according to the control signal of the steering wheel control unit 213.

Referring to FIG. 4, the motor driving unit 27 includes a phase-cut driver and a pre-driver.

The phase-cut driver shorts two or more of the phases of the steering wheel motor 23 by controlling phase cut switches 232 connected to the respective phases of the steering wheel motor 23.

The pre-driver shorts two or more of the phases of the steering wheel motor 23 by controlling the respective switches within an inverter 231 that controls the rotation speed of the steering wheel motor 23.

That is, the pre-driver turns on one or more of upper switches and one or more of lower switches, among six switches within the inverter 231, and turns on two or more phase-cut switches 232 connected to upper and lower switches of the phase-cut driver.

Therefore, two or more of the phases of the steering wheel motor 23 are shorted. The number of shorted phases may be set according to the capacity of the steering wheel motor 23 or the like.

Since the phase-cut switch 232 and the inverter 231 for driving the steering wheel motor 23 are obvious to those skilled in the art, the detailed descriptions thereof will be omitted herein.

As such, the steering wheel control unit 213 controls the motor driving unit 27 to short two or more of the phases of the steering wheel motor 23. In this case, when the steering wheel 22 is turned by a driver's manipulation, the steering wheel motor 23 operates like a generator to generate a counter electromotive force, and thus generates torque in the opposite direction of the steering wheel manipulation direction of the driver.

That is, when the driver gets in or out of the vehicle, the steering wheel control unit 213 may generate a steering reaction force against the steering wheel 22 in the opposite direction of a turn direction by an external force, such that the driver can get in or out of the vehicle with his/her hand held on the steering wheel 22, which makes it possible to improve the convenience when getting on/off the vehicle.

Hereafter, a steering wheel control method of an SBW system in accordance with an embodiment of the present disclosure will be described with reference to FIGS. 5 and 6.

Figure 5:
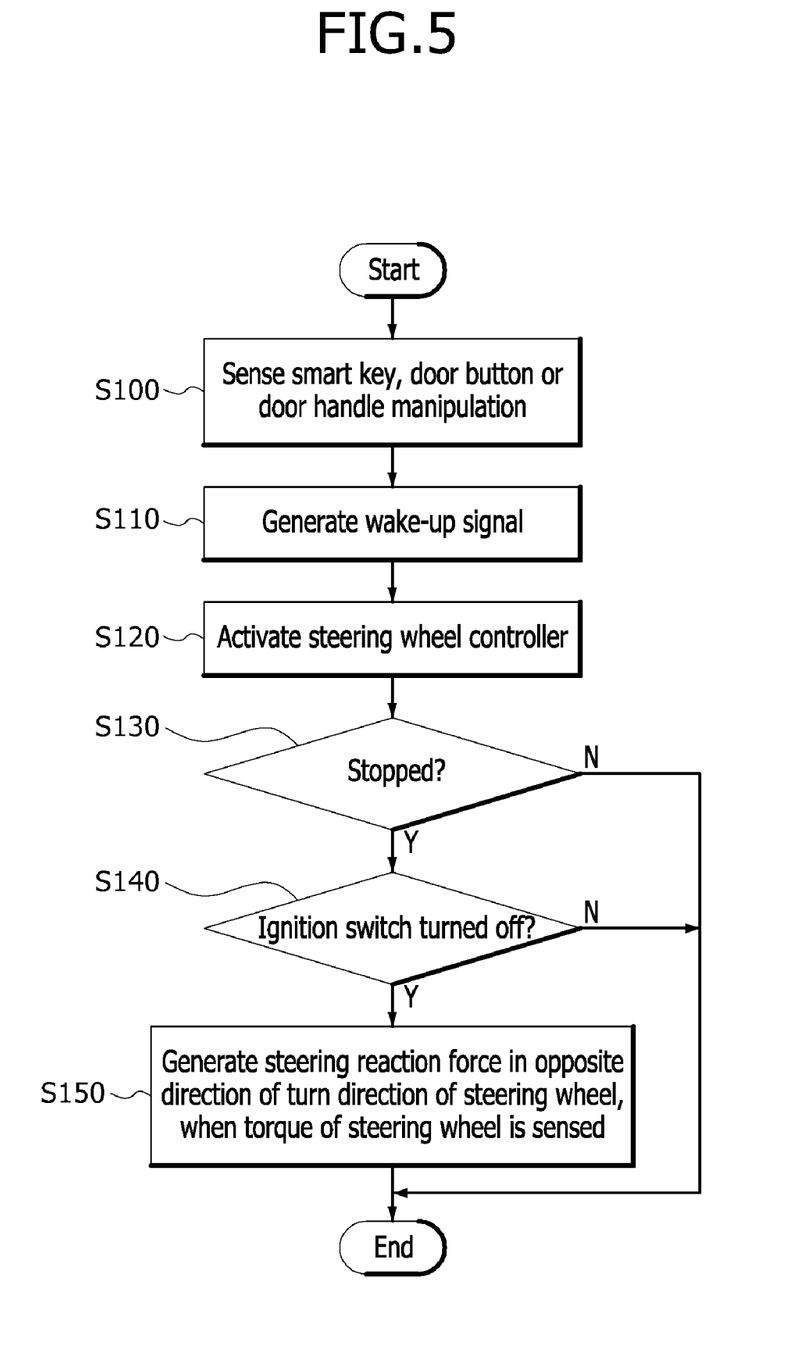
FIG. 5 is a flowchart illustrating a steering wheel control method of an SBW system when getting in a vehicle, in accordance with an embodiment of the present disclosure.

FIG. 5 is a flowchart illustrating a steering wheel control method of an SBW system when getting in a vehicle, in accordance with an embodiment of the present disclosure.

Referring to FIG. 5, when a smart key is sensed, a door button of the smart key is held down, or a door handle operation is sensed in step S100 while the ignition switch of a vehicle is turned off, the dominant controller 10 generates a wake-up signal in step S110.

The steering wheel controller 21 is activated according to the wake-up signal received from the dominant controller 10, in step S120.

As the steering wheel controller 21 is activated, the steering wheel control unit 213 performs fault diagnosis, and outputs the fault diagnosis result through the cluster or the like.

When the diagnosis result indicates that there is no fault, the steering wheel control unit 213 receives a vehicle speed from the vehicle speed sensor 32, and determines whether the vehicle is stopped, based on the vehicle speed, in step S130.

When the determination result of step S130 indicates that the vehicle is stopped, the steering wheel control unit 213 determines whether the ignition switch is turned off, based on the ignition switch off signal, in step S140.

When the determination result of step S140 indicates that the ignition switch is turned off, the steering wheel control unit 213 may short two or more of the phases of the steering wheel motor 23 by controlling the motor driving unit 27 according to the torque of the steering wheel 22, received from the torque sensor 24, thereby generating a steering reaction force against the steering wheel 22 in the opposite direction of a turn direction by an external force, in step S150.

In this case, the steering wheel control unit 213 may generate the steering reaction force against the steering wheel 22 during a preset get-on time after the wake-up signal is received from the dominant controller 10, or generate the steering reaction force against the steering wheel 22 until the ignition switch is turned on after the wake-up signal is received from the dominant controller 10.

Figure 6:
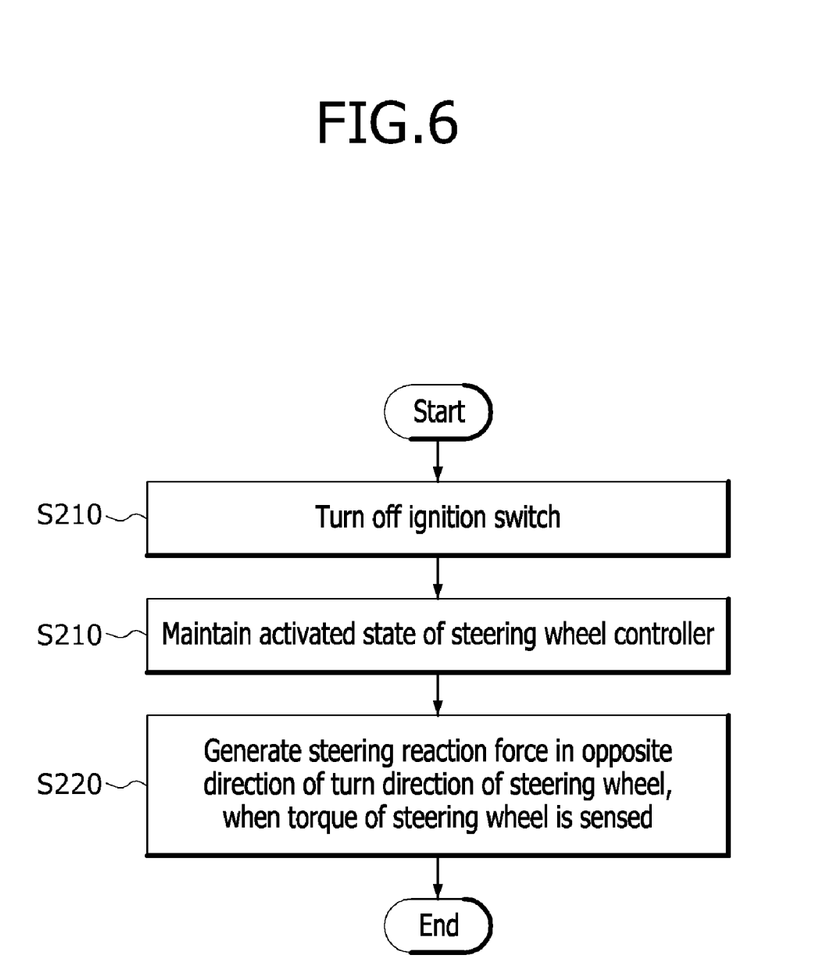
FIG. 6 is a flowchart illustrating a steering wheel control method of the SBW system 20 when getting off a vehicle, in accordance with an embodiment of the present disclosure.

FIG. 6 is a flowchart illustrating a steering wheel control method of the SBW system 20 when getting off a vehicle, in accordance with an embodiment of the present disclosure.

Referring to FIG. 6, when the ignition switch is turned off or the ignition switch off signal is applied in step S200 after the traveling is ended, the steering wheel control unit 213 does not enter a sleep mode, but maintains the activated state, in step S210.

At this time, the torque sensor 24 senses the torque of the steering wheel 22, and inputs the sensed torque to the steering wheel control unit 213, and the steering wheel control unit 213 shorts two or more of the phases of the steering wheel motor 23 by controlling the motor driving unit 27 according to the torque of the steering wheel 22, received from the torque sensor 24, thereby generating a steering reaction force against the steering wheel 22 in the opposite direction of the turn direction by the external force, in step S220.

In this case, the steering wheel control unit 213 may generate the steering reaction force against the steering wheel 22 during a preset get-off time after the ignition switch off signal is inputted, generate the steering reaction force until the door handle of the vehicle is manipulated to close the door, after the ignition switch off signal is inputted to the steering wheel 22, or generate the steering reaction force until no driver is sensed by the driver sensor 31.

The steering wheel control apparatus and method of an SBW system, which can generate a steering reaction force against a steering wheel while an ignition switch is turned off, and prevent the turn of the steering wheel even though a driver holds the steering wheel while getting in or out of a vehicle.

As described herein, the steering wheel control apparatus and method of the SBW system may generate a steering reaction force against the steering wheel while the ignition switch is turned off, such that the steering wheel is not turned even though a driver holds the steering wheel while getting on or off the vehicle.

As such, the steering wheel control apparatus and method of the SBW system in accordance with the embodiment of the present disclosure may generate a steering reaction force against the steering wheel while the ignition switch is turned off, such that the steering wheel is not turned even though a driver holds the steering wheel while getting on or off the vehicle.

The devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of operating a processor. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A steering wheel control apparatus of an SBW (Steer-By-Wire) system, comprising:
    a dominant controller configured to generate a wake-up signal, in response to an ignition switch of a vehicle being off;
    a motor driver configured to generate a steering reaction force against a steering wheel through a motor; and
    a steering wheel controller configured to generate the steering reaction force to interrupt a turn of the steering wheel, by controlling the motor driver according to the wake-up signal, wherein the steering reaction force is generated until a door handle of the vehicle is manipulated to close a vehicle door.

2. The steering wheel control apparatus of claim 1, wherein the dominant controller is further configured to generate the wake-up signal, in response to a smart key being manipulated while the ignition switch is turned off.

3. The steering wheel control apparatus of claim 1, wherein the dominant controller is further configured to generate the wake-up signal, in response to a door handle of the vehicle being manipulated to open a door while the ignition switch is turned off.

4. The steering wheel control apparatus of claim 1, wherein the steering wheel controller is further configured to generate the steering reaction force against the steering wheel for a time period, in response to the wake-up signal being received.

5. The steering wheel control apparatus of claim 1, wherein the steering wheel controller is further configured to generate the steering reaction force against the steering wheel until the ignition switch is turned on, in response to the wake-up signal being received.

6. The steering wheel control apparatus of claim 1, wherein the steering wheel controller comprises:
    a steering wheel control configured to control the motor driver to generate the steering reaction force against the steering wheel;
    a regulator configured to supply operation power to the steering wheel control;
    a power switch configured to control power supplied to the regulator from a battery;
    a switch controller configured to control the power switch to supply power from the battery to the regulator or to block the power; and
    a CAN (Controller Area Network) transceiver configured to receive the wake-up signal from the dominant controller and to control the switch controller.

7. The steering wheel control apparatus of claim 1, wherein the steering wheel controller is further configured to short a phase of the motor through the motor driver to generate a counter electromotive force against the motor when the steering wheel is turned by an external force.

8. A steering wheel control method of an SBW (Steer-By-Wire) system, comprising:
    generating, by a dominant controller, a wake-up signal while an ignition switch of a vehicle is turned off; and
    generating, by a steering wheel controller, a steering reaction force to interrupt a turn of a steering wheel, by controlling a motor driver according to the wake-up signal, wherein the steering reaction force is generated until a door handle of the vehicle is manipulated to close a vehicle door.

9. The steering wheel control method of claim 8, wherein the generating of the steering reaction force to interrupt the turn of the steering wheel comprises:
    shorting, by the steering wheel controller, a phase of a motor through the motor driver to generate a counter electromotive force against the motor when the steering wheel is turned by an external force.

10. A steering wheel control apparatus of an SBW system, comprising:
    a motor driver configured to generate a steering reaction force against a steering wheel through a motor; and
    a steering wheel controller configured to generate the steering reaction force to interrupt a turn of the steering wheel, by controlling the motor driver, in response to an ignition switch off signal being received, wherein the steering reaction force is generated until no driver is sensed in the vehicle and wherein the steering reaction force is generated until a door handle of the vehicle is manipulated to close a vehicle door.

11. The steering wheel control apparatus of claim 10, wherein the steering wheel controller is further configured to generate the steering reaction force against the steering wheel for a time period, in response to the ignition switch off signal being inputted.

12. The steering wheel control apparatus of claim 10, wherein the steering wheel controller is further configured to generate the steering reaction force against the steering wheel, until a door handle of a vehicle is manipulated to close a door, in response to the ignition switch off signal being inputted.

13. The steering wheel control apparatus of claim 10, wherein the steering wheel controller is further configured to generate the steering reaction force against the steering wheel, until no driver is sensed in the vehicle, in response to the ignition switch off signal being inputted.

14. The steering wheel control apparatus of claim 10, wherein the steering wheel controller comprises:
   a steering wheel control configured to generate a steering reaction force against the steering wheel by controlling the motor driver, in response to the ignition switch off signal being inputted;
   a regulator configured to supply operation power to the steering wheel control;
   a power switch configured to control power supplied to the regulator from a battery;
   a switch controller configured to control the power switch to supply power from the battery to the regulator or to block the power; and
   a CAN transceiver configured to receive the ignition switch off signal, and to enter a sleep mode according to a control signal of the steering wheel controller.

15. The steering wheel control apparatus of claim 10, wherein the steering wheel controller is further configured to short a phase of the motor through the motor driver to generate a counter electromotive force against the motor when the steering wheel is turned by an external force.

16. A steering wheel control method of an SBW (Steer-By-Wire) system, comprising:
   receiving, by a steering wheel controller, an ignition switch off signal; and
   generating, by the steering wheel controller, a steering reaction force to interrupt a turn of a steering wheel of a vehicle, by controlling a motor driver, wherein the steering reaction force is generated until no motor driver is sensed in the vehicle and wherein the steering reaction force is generated until a door handle of the vehicle is manipulated to close a vehicle door.

17. The steering wheel control method of claim 16, wherein the generating of the steering reaction force to interrupt the turn of the steering wheel comprises:
   shorting, by the steering wheel controller, a phase of a motor through the motor driver to generate a counter electromotive force against the motor when the steering wheel is turned by an external force.

\* \* \* \* \*